Sept. 24, 1940.   L. B. JONES   2,215,736
BULK MATERIAL HANDLING
Filed March 26, 1940   3 Sheets-Sheet 1
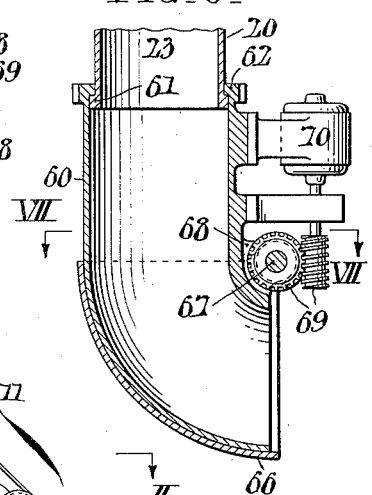
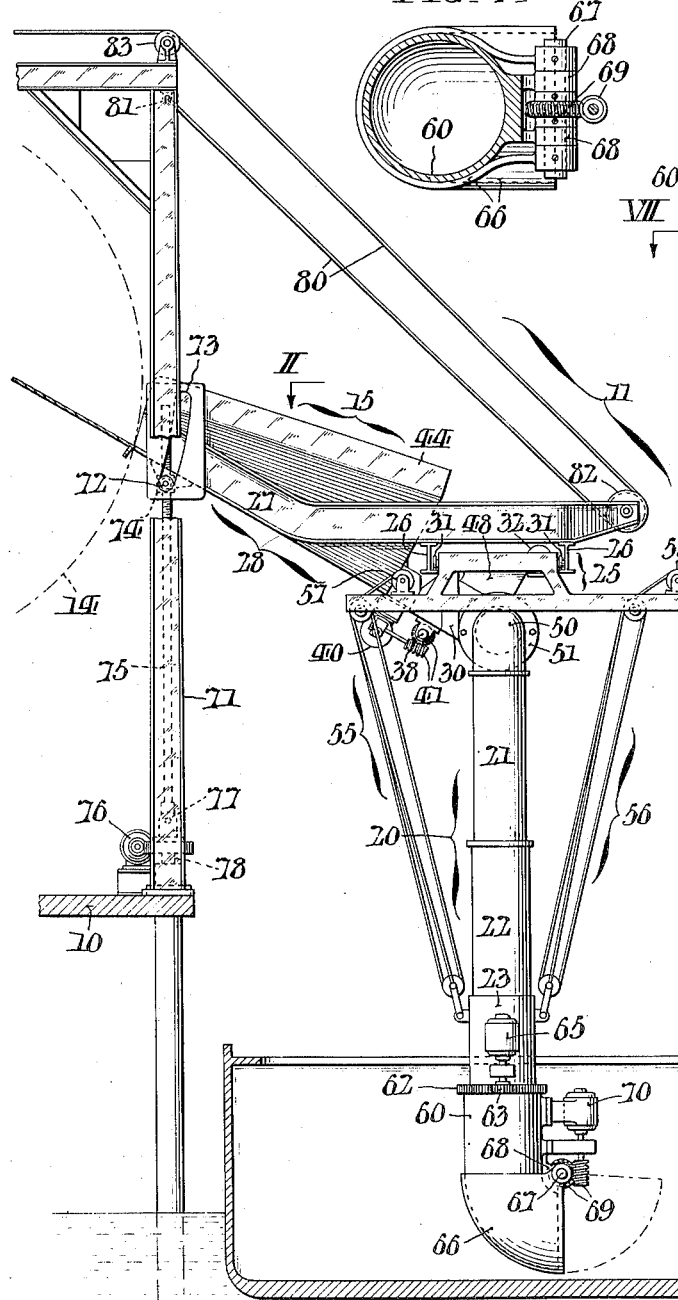
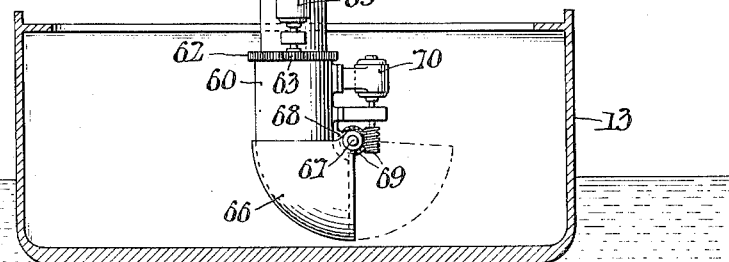
INVENTOR:
Lloyd B. Jones,
BY
ATTORNEYS.

Sept. 24, 1940.   L. B. JONES   2,215,736
BULK MATERIAL HANDLING
Filed March 26, 1940   3 Sheets-Sheet 2
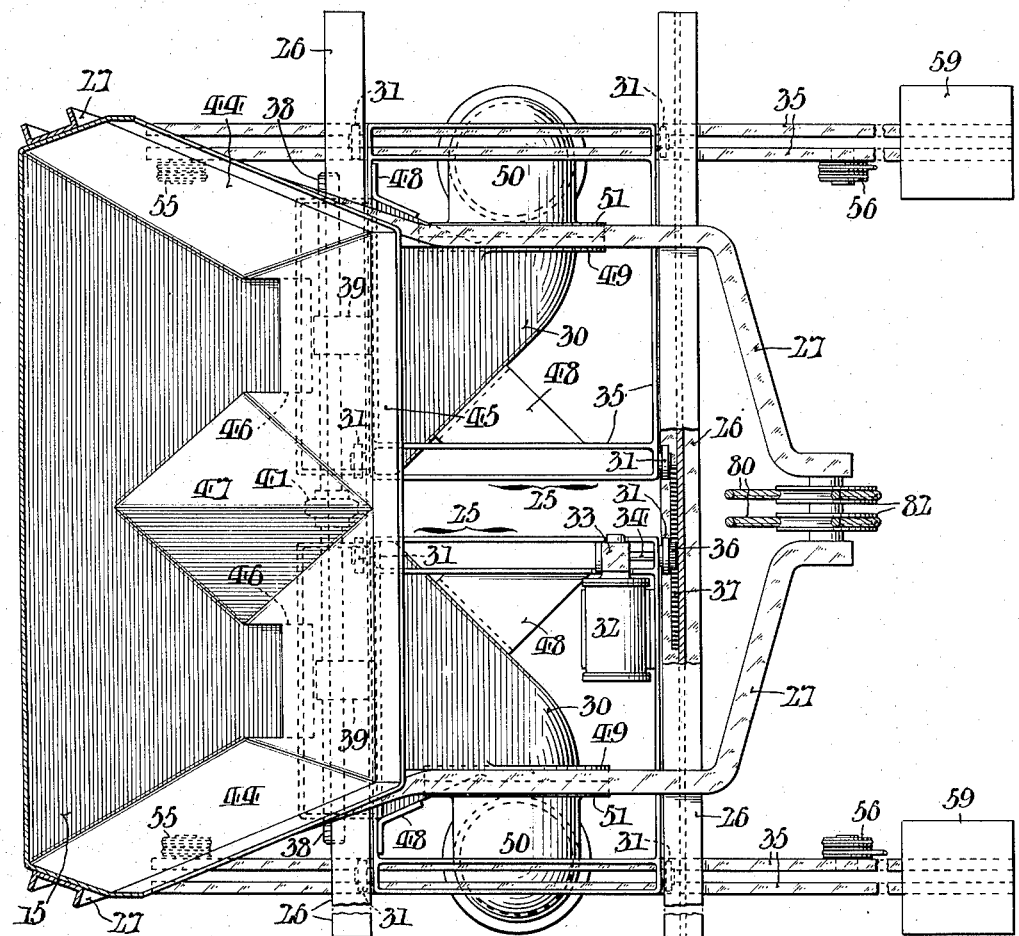
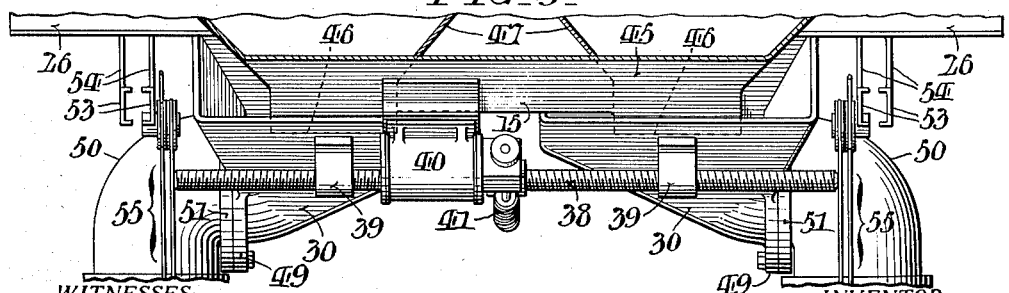

Sept. 24, 1940.                L. B. JONES                2,215,736
                        BULK MATERIAL HANDLING
                    Filed March 26, 1940        3 Sheets-Sheet 3
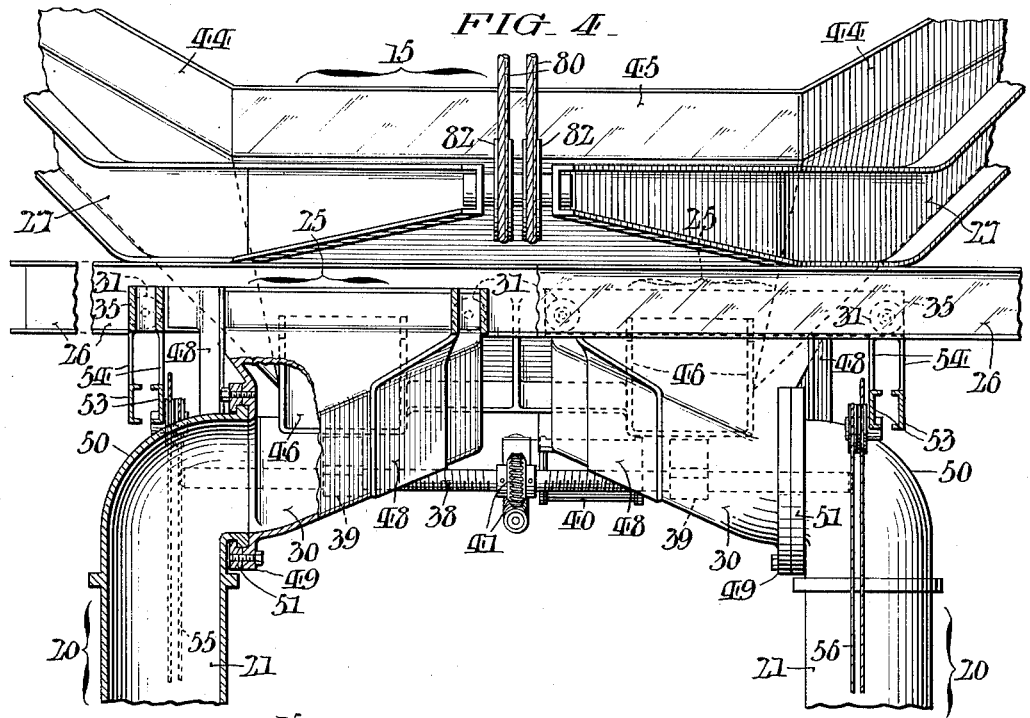
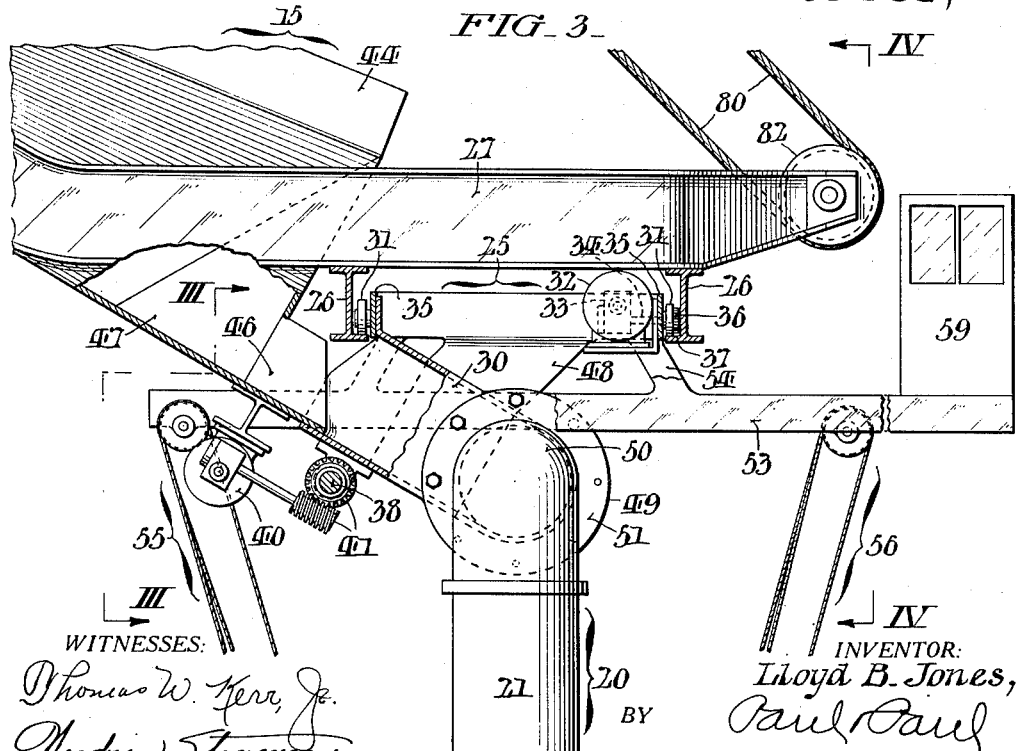
WITNESSES:
Thomas W. Kerr, Jr.
Woodrow Stevenson
INVENTOR:
Lloyd B. Jones,
BY
Paul & Paul
ATTORNEYS.

Patented Sept. 24, 1940

2,215,736

UNITED STATES PATENT OFFICE 2,215,736

BULK MATERIAL HANDLING

Lloyd B. Jones, Altoona, Pa., assignor to The Pennsylvania Railroad Company, Philadelphia, Pa., a corporation of Pennsylvania Application March 26, 1940, Serial No. 325,960

7 Claims. (Cl. 214—14)

This invention relates to the handling of loose bulk materials, and especially to the loading of carriers such as vessels or barges, for example, and is hereinafter explained with particular reference to the loading of vessels with coal or the like. The invention permits of speeding up the loading and of facilitating the necessary movement of the carrier past the loading apparatus. It also permits of distributing the coal in the carrier advantageously, and of controlling the rate of coal delivery effectively and with nicety. Other features and advantages of the invention will appear from the description of a species and form of embodiment, and from the drawings. All the features and combinations shown or described are of my invention, so far as novel.

In the drawings, Fig. 1 is a general side view of material handling and loading apparatus conveniently embodying the invention, a carrier such as a barge or vessel into which the material is to be loaded being shown in cross section; Fig. 2 is a partial plan view of my loading apparatus with the chute shown in Fig. 1 broken away and in section, substantially as indicated by the line and arrows II—II in Fig. 1; Fig. 3 is a side view of portions of the apparatus on a larger scale than Fig. 1, certain parts being broken away and in section; Fig. 4 is a partial end view from the right in Figs. 1 and 2, with certain portions of the apparatus in vertical section as indicated by the line and arrows IV—IV in Fig. 2; and Fig. 5 is a partial end view from the opposite side, taken as indicated by the line and arrows V—V in Fig. 3.

Fig. 6 is a detached vertical mid-sectional view of the lower portion of the chute shown in Fig. 1, on a larger scale; and Fig. 7 is a plan view with certain parts in horizontal section as indicated by the line and arrows VII—VII in Fig. 6.

Fig. 1 shows a loading station at a wharf 10, equipped with my material-handling apparatus 11 for transferring and loading coal or other loose bulk material into the hold of a carrier vessel 13 alongside the wharf 10. A car-dumping machine 14 is shown for introducing the bulk material into the supply container, conduit, or hopper 15 of the apparatus 11, and may be of any suitable type, such as that illustrated in my application Serial No. 302,804, filed November 4, 1939. Or the bulk material may be introduced into the supply container, conduit, or hopper 15 of the apparatus 11 by any other suitable method. From the supply hopper 15, the material is delivered into the vessel 13 through a chute 20 which is arranged to swing inward and outward relative to the hopper, transversely of the vessel as it lies alongside the wharf 10, to distribute the lading in the hold of the vessel. As a provision for adjusting the chute 20 in length, it may be constructed of telescopic sections 21, 22, 23. To permit more rapid loading, a group of (two) chutes 20 are shown in Figs. 2, 4, and 5, mounted for independent movement transversely of the vessel 13, though to avoid confusion, only one of the chutes 20 appears in Figs. 1 and 3.

In accordance with my invention, I provide for having the vessel 13 move continuously but slowly past the loading station, at a rate properly correlated with the feed of coal through the chute(s) 20 into its hold, and for having the chute(s) 20 move with the vessel relative to the supply container or hopper 15. For this purpose, each of the chutes 20 is mounted on a support or carriage 25 movable across the hopper 15, as on guide-ways 26, 26 (of I-beam section) that are associated with the hopper, Figs. 1, 2, 3, and 4, and may be mounted on outward extension of side members 27, 27 forming part of a supporting structure 28 that sustains the hopper. As shown, each chute 20 receives coal from the hopper 15 through a transmission conduit or hopper 30 that is mounted on or forms part of the carriage 25 supporting the chute.

In the present instance, there are separate (but interconnected) transmission hoppers or ducts 30, 30 and carriages 25, 25 for the two chutes 20, 20, and each of the carriages has rollers 31, 31 that run on flanges of the I-beams 26, 26 as trackways. On one of the carriages 25, 25 there is shown a reversible (electric) motor 32 connected through gearing 33 and a short shaft 34 (mounted in bearings on the carriage frame 35) to a pinion 36 meshing with a rack 37 fixed to one of the trackways 26. In Figs. 2, 3, 4, and 5, there is shown a right-and-left screw 38 whose opposite threads engage with nut-brackets 39, 39 attached to the hoppers 30, 30, and a reversible (electric) motor 40 on one of the hoppers is operatively connected to this screw 38 through worm reduction gearing 41. By means of the motor 32 and the rack-and-pinion mechanism 36, 37, the carriages 25, 25, hoppers 30, 30, and chutes 20, 20 may all be moved along the ways 26, 26 a limited distance, either in the direction of motion of the carrier 13, at the same rate as the vessel, or counter to the movement of the carrier; while by means of the motor 40 and the right-and-left screw 38, the carriages 25, 25, hoppers 30, 30, and chutes 20, 20 may be shifted and adjusted (along the ways 26, 26) relative to one another.

Referring, now to the hopper 15, it will be seen from Figs. 1, 2, 3, and 4 that its bottom slopes downward and outward toward the ducts 30, and that its flaring sides 44 converge toward its lower end wall 45, through which open two chute-mouths with trough-like lips 46 that overlie the bottoms of the hopper-ducts 30 and deliver into them. Between the mouths 46, the end wall 45 has an outstanding ridge 47 whose sloping flanks divide the coal in the hopper and direct it into said mouths. As shown in Fig. 3, the upper wall of each duct 30 is attached to the inner sides of the carriage frames 35, and the duct is further supported by a bracket plate 48 attached to the duct side and to one end of the frame 35, Figs. 2, 3, and 4. The lower end of the duct 30 has a lateral opening with a surrounding flange 49 wherein is a rabbeted annular seat for a flanged elbow 50 at the upper end of the chute 20, which is held in said seat (with freedom to turn) by a split rabbeted ring 51 bolted to the duct flange 49. As shown in Figs. 2 and 4, the chute-mouths 46 of the hopper 15 are considerably narrower than the open upper ends or mouths of the hopper-ducts 30 into which they extend, so that the ducts 30 have a considerable range of movement along the ways 26 while receiving material from the hopper.

From the remote ends of the carriage frames 35, cross-beams 53 are supported by means of short members 54. As shown in Figs. 2, 4, and 5, each cross-beam 53 comprises a pair of channel members facing each other, and its members 54 are likewise double. As best shown in Fig. 1, the provision for swinging each chute 20 transversely of the vessel 13 (and of the ways 26) comprises a pair of cable tackles 55, 56 connected between the lower chute section 23 and the ends of the corresponding cross-beam 53, at opposite side of the chute 20. The live ends of the cables are connected to suitably operated winding drums 57, 58 on said cross-beam. By taking up on the tackle 55 while paying out on the tackle 56, or vice-versa, the chute 20 can be swung across the hold of the vessel 13; by taking up or paying out on both tackles, the chute can be shortened or lengthened; and by a suitable combined action of the two tackles, the chute can be swung to and fro and concurrently lengthened and shortened, so as to follow the floor of the hold from side to side of the vessel 13. As shown, each of the chute sections 21, 22 has an external stop flange near its upper end, so that when the section 23 is lifted around the section 22 it eventually lifts the section 22 inside it, and the latter in turn eventually lifts the section 21. On the outer ends of the cross-beams are shown shelters 59 for the operators and the controls for operating the apparatus.

As shown in Figs. 1 and 6, each chute 20 has at its discharge end a short 90° elbow section 60 which is mounted around an external flange 61 on the lowest telescoping section 23 to turn relative thereto, about the longitudinal axis of the chute 20, and is provided with gear teeth on an external flange 62 at its upper end. With these gear teeth at 62 meshes a pinion 63 on the shaft of a reversible (electric) motor 65 mounted on the chute section 23. By this means the elbow section 60 can be turned to direct its lateral opening toward either side of the vessel 13, or in any direction desired. As shown in Figs. 1, 6, and 7, a supplemental 90° elbow and gate 66 is mounted to swing about the axis of the elbow 60 into positions of more or less telescopic interlap therewith (externally), as a means of changing the direction of the discharge from the chute 20, or even practically shutting off the discharge. For this purpose, hubs on the sides of the elbow gate 66 are keyed fast to a shaft 67 mounted in bracket lugs or ears 68 on the elbow section 60; and the shaft 67 is operatively connected through a worm and gear 69 to the shaft of a reversible (electric) motor 70 mounted on said elbow 60. When the gate 66 is swung up from its full-line position to the dot and dash position in Fig. 1, its stops discharge from the chute 20; while in intermediate positions it checks the flow therethrough more or less, and directs the discharge more or less upward.

The supply hopper 15 and its supporting structure 28 may be mounted on the framework 71 of the dumping machine 14 with provision for raising and lowering it, and for adjusting and changing its slope according to the character of the material being handled, etc. As shown in Fig. 1, the inner, upper end of the hopper 15 has at its corner (attached to the supporting side member 27) a roller 72 engaging in an arcuate guide-slot in a bracket plate 73 attached to the machine frame 71. A nut-block 74 pivoted to the corner of the hopper 15 (or rather to its supporting member 27) is in threaded engagement with a supporting screw 75 operable by a reversible (electric) motor 76 through a universally flexible joint 77, and having a thrust bearing 78 on the frame 71. The outer end of the hopper 15 (or of the supporting structure 28) is supported by a flexible cable 80 extending from an anchorage 81 on the frame 71 around a pulley 82 mounted on an axis connected between the outer ends of the sides 27, 27 of the structure 28, and thence over a pulley 83 on the frame 71 to suitable anchorage or winding means (not shown). The provisions for guiding and sustaining the other corner of the hopper 15 (not shown) may be similar to those above described, and the supporting cable 80 and the associated parts may also be duplicated, as indicated in Figs. 2 and 4.

In loading bulk material into a carrier 13 with the apparatus 11, a preferred method is to move the carrier 13 slowly but continuously along the wharf 10 past the loading station, while alternately moving the chute(s) 20 forward along with the carrier 13 a limited distance, during the feed of material through the chute(s) into the carrier, and returning the chute(s) backward a similar distance, counter to the continuing movement of the carrier. Of course the chute(s) is (are) also generally moved transversely of the carrier 13 during this forward movement of chute(s) and carrier, to distribute the lading across the hold of the vessel, as already mentioned.

In the case of a decked carrier 13 with a series of transverse loading hatches substantially uniformly spaced—such as the usual cargo vessels on the Great Lakes—the material may be thus fed through the swinging chute(s) 20 at each hatch, or at adjacent hatches concurrently, while the chute(s) 20 and hopper(s) 30 move forward with the carrier from beginning to end of the loading through each hatch or group of adjacent hatches. The rate of movement of the carrier 13 along the wharf 10 being controlled in proper correlation with the rate of coal feed (as by means of the usual warping winches on the wharf 10), loading through each hatch or pair of adjacent hatches may be completed within the permitted range of movement of the carriage(s) 25 along the ways 26. Therepon the feed of coal through the chute(s) 20 may be temporarily stopped, by means of the gate 66; the transverse swinging of the chute may be stopped, and the chute(s) shortened and lifted out of the hatch(es); the carriage(s) 25 may be moved backward (opposite to the direction of movement of the carrier 13), and temporarily held above the deck, if necessary, until the next hatch(es) are directly under them; and then the chutes may be quickly lowered into the hatch(es) in question, and loading and distribution of coal (through them) resumed. This cycle of operations may be repeated at each hatch or group of hatches, until the carrier 13 is fully loaded during its continuous forward movement past the loading station.

The suspension of feeding through the chute(s) 20 while lifted out of the hatch(es) may be very brief, and even almost nil, if the forward movement of the carriage(s) 25 with the carrier 13 is substantially equal to the spacing of adjacent hatches (or groups of hatches) of the carrier, since this interval is quickly traversed in the relatively rapid backward movement of the carriage(s) 25 that is practicable. In the case of a substantially deckless or open vessel or barge, it may not even be necessary to interrupt the feed of material through the chute 20 during the return or backward movements of the chute: i. e., the feed through the chute may go on continuously throughout its series of forward and return movemnts, until the loading of the carrier is completed.

Having thus described my invention, I claim:

1. An improved method of loading loose bulk material such as coal into a movable carrier, through a chute, at a loading station; which method comprises moving the carrier continuously past the loading station; and alternately moving the chute along with the carrier a limited distance and also transversely of the carrier, while feeding the material through the chute into the carrier, and returning the chute backward a similar distance, counter to the movement of the carrier.

2. In apparatus for loading loose bulk material such as coal into a movable carrier, through a chute, at a loading station; the combination with the chute and a fixed supply hopper for the material at the loading station; of means for alternately moving the chute along with the carrier a limited distance and also transversely of the carrier, while concurrently feeding the material through the chute into the carrier, and for returning the chute backward a similar distance, counter to the movement of the carrier, between the movements of the chute with the carrier as aforesaid.

3. In apparatus for loading loose bulk material into a movable carrier, the combination with a supply hopper for the bulk material, and a chute delivering the material from said supply hopper into the carrier and itself movable transversely of the carrier to distribute the material, of a carriage sustaining said chute and mounted for movement relative to the supply hopper with and in the direction of the movement of the carrier, and a transmission duct on said carriage receiving the material from said supply hopper during its own movement relative to the hopper with the carriage and delivering the material to the chute while the latter is moving transversely as aforesaid.

4. In apparatus for loading loose bulk material into a movable carrier, the combination with a supply hopper for the bulk material and associated supporting structure, of ways also carried by said supporting structure extending in the direction of movement of the carrier and crosswise of the hopper, a carriage movable along said ways, with a transmission duct thereon receiving the material from said supply hopper, and a chute supported by said carriage receiving the material from said transmission hopper and swingable transversely of said ways.

5. In apparatus for loading loose bulk material into a movable carrier, the combination with a supply hopper for the bulk material and associated supporting structure, comprising members at the sides of the hopper prolonged outward beyond its delivery end, of ways carried by said members beyond said hopper end extending in the direction of movement of the carrier, crosswise of the hopper, carriage means movable along said ways and carrying transmission duct means receiving the material from said supply hopper, chutes supported by said carriage means receiving the material from said transmission duct means and independently swingable transversely with reference to said ways, and means for moving said carriage means along said ways, and for also shifting said chutes toward or from one another.

6. In apparatus for loading loose bulk material into a movable carrier, the combination with a supply hopper for the bulk material and associated supporting structure, of ways also carried by said supporting structure extending in the direction of movement of the carrier and crosswise of the hopper, carriages movable along said ways, with transmission ducts thereon receiving material from said supply hopper, means for moving said carriages together along said ways, and for also shifting them therealong relative to one another, and chutes supported by said carriages receiving the material from said transmission hoppers, and independently movable transversely with reference to said ways.

7. In apparatus for loading loose bulk material into a movable carrier, the combination with a supply hopper for the bulk material and associated supporting structure, of ways also carried by said supporting structure extending in the direction of movement of the carrier and crosswise of the hopper, a carriage movable along said ways, with a transmission duct thereon receiving the material from said supply hopper, a chute of telescoping sections supported by said carriage and swingable transversely of said ways, and receiving the material from said transmission hopper, with an elbow at the lower end of said chute rotatable relative thereto about the longitudinal axis of the chute, and a supplemental elbow and gate swingable about said elbow into positions of more or less interlap with the elbow.

LLOYD B. JONES.